(12) United States Patent
Vishwakarma et al.

(10) Patent No.: US 11,999,318 B2
(45) Date of Patent: Jun. 4, 2024

(54) TAMPER DETECTION SYSTEM

(71) Applicant: Bendix Commercial Vehicle Systems LLC, Avon, OH (US)

(72) Inventors: Pratima Vishwakarma, Pune (IN); Tandi Wijaya, Highland Heights, OH (US); Daniel P Zula, North Ridgeville, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 352 days.

(21) Appl. No.: 17/674,277

(22) Filed: Feb. 17, 2022

(65) Prior Publication Data

US 2023/0256940 A1 Aug. 17, 2023

(51) Int. Cl.
*B60R 25/30* (2013.01)
*B60R 25/01* (2013.01)
*B60R 25/20* (2013.01)
*G01J 1/42* (2006.01)

(52) U.S. Cl.
CPC .............. *B60R 25/30* (2013.01); *B60R 25/01* (2013.01); *B60R 25/20* (2013.01); *G01J 1/4204* (2013.01)

(58) Field of Classification Search
CPC ......... B60R 25/01; B60R 25/20; B60R 25/30; G01J 1/4204; H05K 5/0026; H05K 5/0208
See application file for complete search history.

(56) References Cited

U.S. PATENT DOCUMENTS

| | | | |
|---|---|---|---|
| 10,437,276 B2 | 10/2019 | Lee | |
| 10,664,626 B2 | 5/2020 | Tang | |
| 2007/0152839 A1* | 7/2007 | Dalzell | G06F 11/3058 340/686.1 |
| 2013/0176009 A1 | 7/2013 | Yang | |
| 2015/0313027 A1* | 10/2015 | Lin | H05K 5/0208 361/752 |

FOREIGN PATENT DOCUMENTS

CN 109471484 A 3/2019

* cited by examiner

*Primary Examiner* — Kevin K Pyo
(74) *Attorney, Agent, or Firm* — Cheryl L. Greenly; Brian E. Kondas; Geoffrey A. Kudlo

(57) ABSTRACT

A tamper detection system for a controller includes a housing, a circuit board mounted in the housing, a voltage input line on the circuit board receiving an operating voltage, a light detection circuit mounted on the circuit board receiving the operating voltage from the voltage input line and a signal conditioning device conditioning the operating voltage and connected to the light detection circuit. The light detection circuit interrupts the operating voltage at the signal conditioning device in response to detecting a source of light having a light value greater than a threshold.

12 Claims, 5 Drawing Sheets

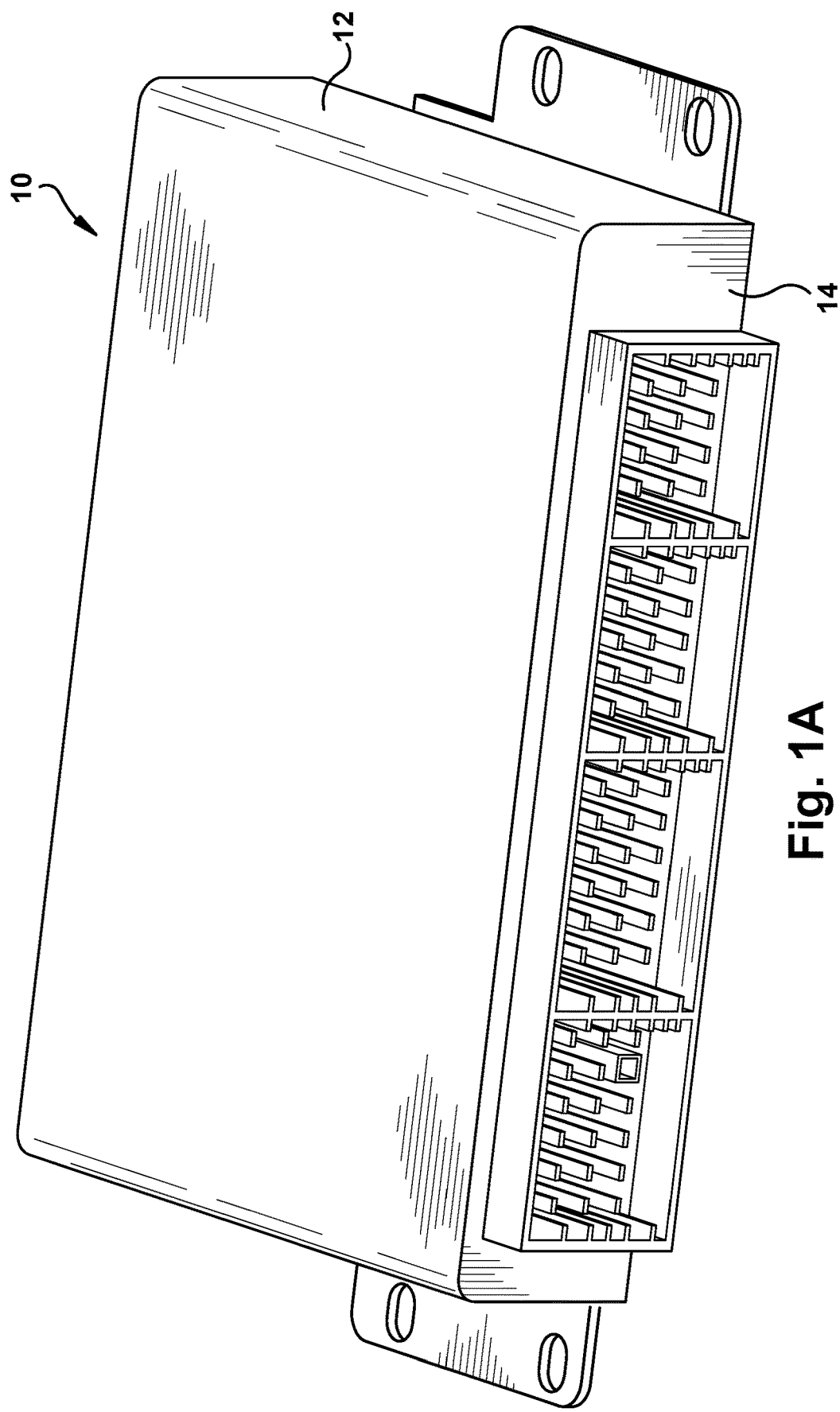

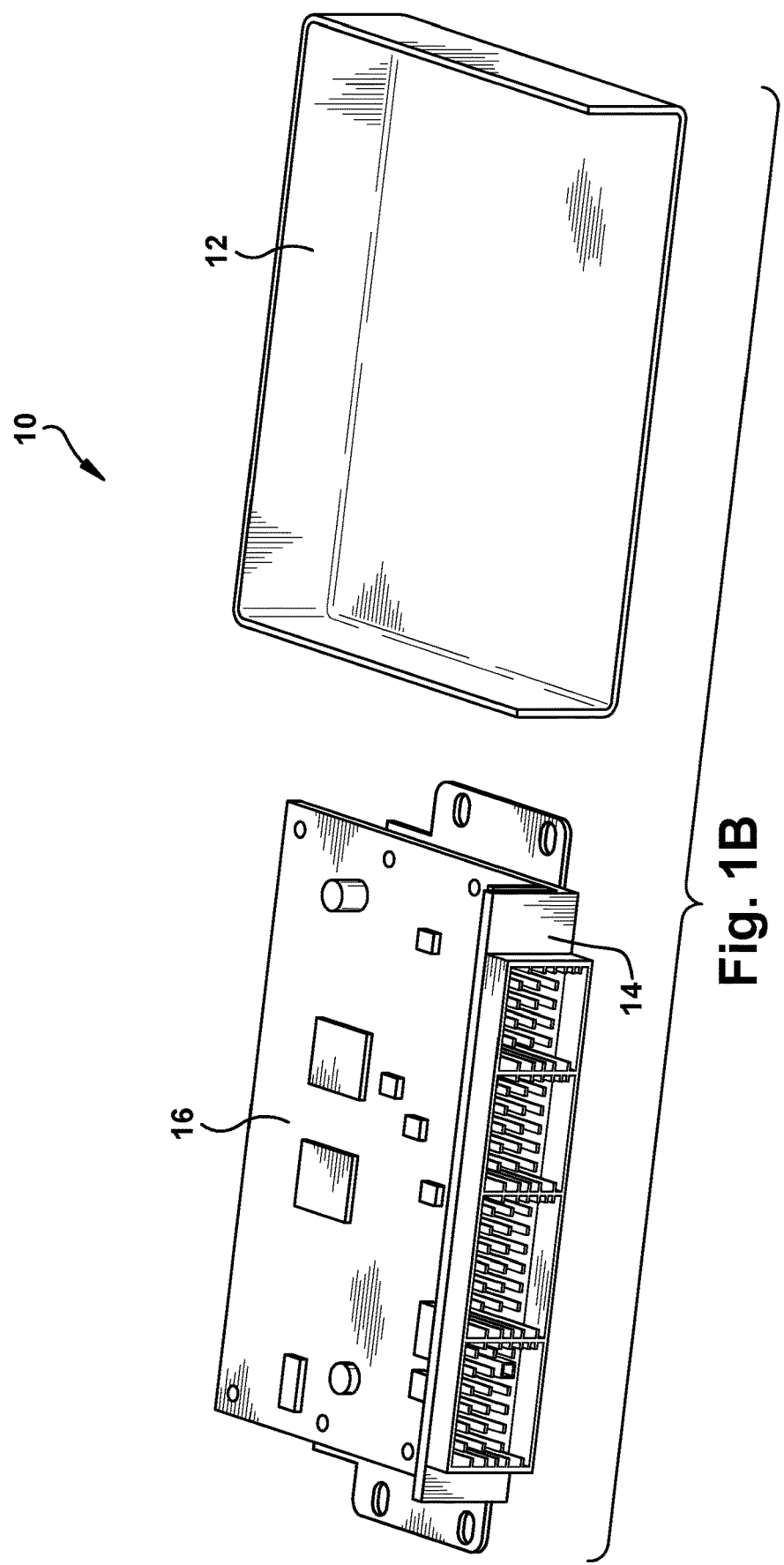

TAMPER DETECTION SYSTEM

BACKGROUND

The present application relates to a controller and method to determine whether a housing of the controller has been subject to an unauthorized opening.

Controllers are used in many electronic vehicle systems, including air brake systems such as anti-lock braking, stability control and adaptive cruise control. While some controllers may be reprogrammable, they are not generally meant to be remanufactured. End users who open the controller housing could be contaminating the sensitive circuitry. A person with malevolent intent may be trying to tap into the microcontroller to download proprietary code. Therefore, there is interest in determining whether a housing of a controller has been improperly tampered with and preventing access to the circuitry of the controller.

SUMMARY

In accordance with one embodiment, a tamper detection system for a controller includes a housing, a circuit board mounted in the housing, a voltage input line on the circuit board receiving an operating voltage, a light detection circuit mounted on the circuit board receiving the operating voltage from the voltage input line and a signal conditioning device conditioning the operating voltage and connected to the light detection circuit. The light detection circuit interrupts the operating voltage at the signal conditioning device in response to detecting a source of light having a light value greater than a threshold.

In accordance with another embodiment, a method for disabling a controller in response to unauthorized access includes receiving an operating voltage and powering a light detection circuit and a signal conditioning device of the controller with the operating voltage. The method further includes comparing a light value to a threshold in the light detection circuit, wherein the light detection circuit inhibits the operating voltage from reaching the signal conditioning device in response to the light value being greater than the threshold. The controller is thereby disabled.

BRIEF DESCRIPTION OF THE DRAWINGS

FIGS. 1A and 1B are representations of a controller having the tamper detection system.

DETAILED DESCRIPTION

Figure 2:
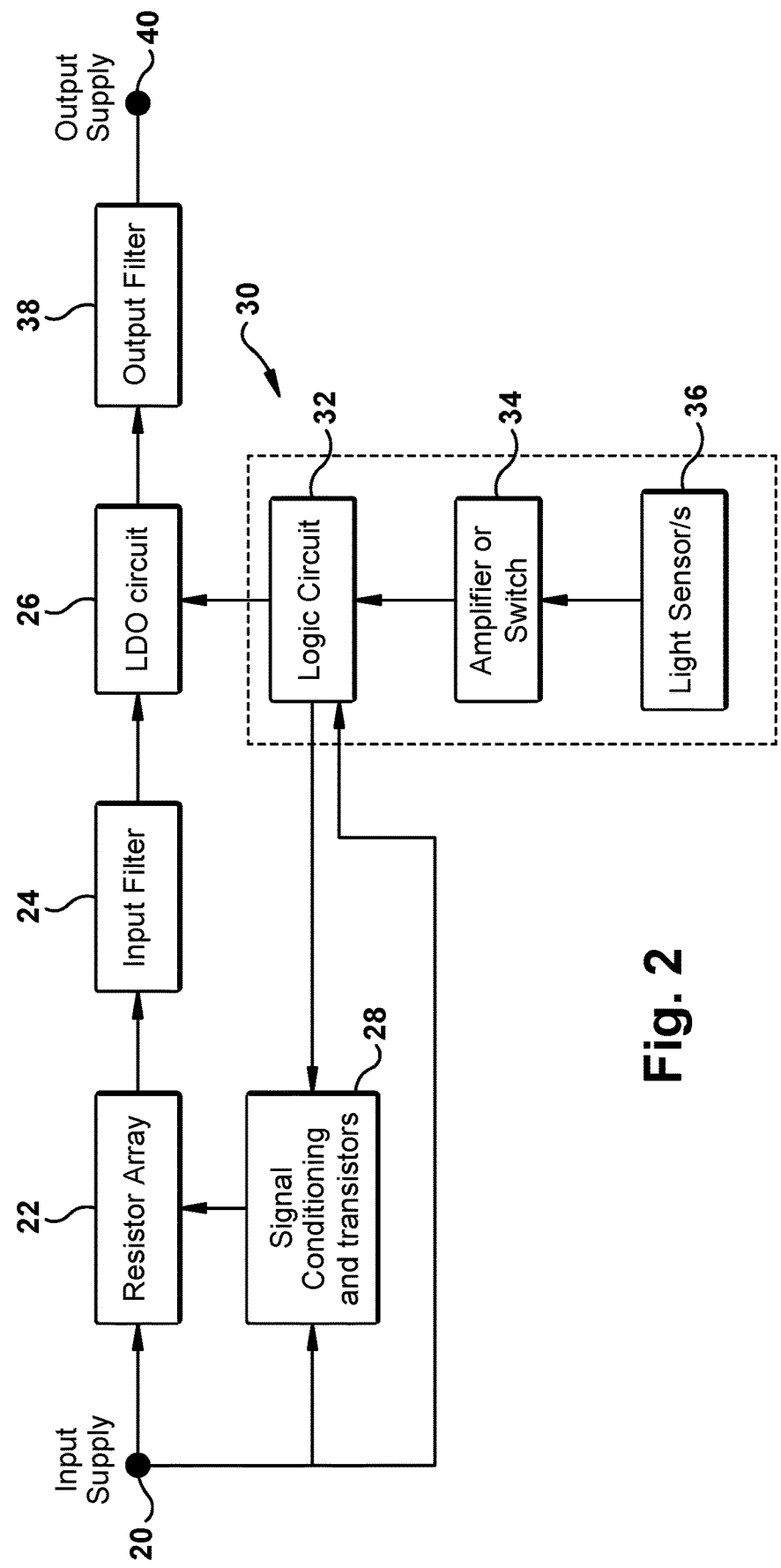
FIG. 2 is a block diagram for implementing the tamper detection system on the controller.

Referring to FIG. 1A, a controller 10 is shown having two visible parts, a housing portion 12 and connector portion 14. The connector portion 14 is attached to the circuit board 16 (as shown in FIG. 1B). The housing portion 12 may be constructed of metal or plastic. The selected plastic material will be opaque or solid, such that no light will normally pass through to the circuit board 16 inside the housing 12. The material is selected based on where on a vehicle the controller 10 is to be installed. A more robust material may be used if the controller 10 is to be exposed to the environment versus being installed in a protected location. The connector portion 14 is joined to the housing portion 12 by fasteners, adhesive, friction fit or by crimping a portion of the housing around the connector portion 14 and circuit board 16. Based on the intended installation location, the controller 10 may be hermetically sealed through the assembly process.

FIG. 1B shows the housing 12 separated from and upside down in relation to the circuit board 16. As is evident, the circuitry of the circuit board 16 is exposed and can be damaged when separated from the housing 12.

The controller 10 is designed for operations such as antilock braking, stability control or adaptive cruise control for a vehicle and should be subject to troubleshooting only by the manufacturer or an authorized representative. The controller 10 is not designed to be remanufactured or taken apart by an unauthorized person. If there is an unauthorized removal of the housing portion 12 from the connector portion 14, the present inventive system will shut down certain operational aspects of the circuit board 16 so that the system cannot be reverse engineered.

The present invention includes a method of detecting when the housing 12 is not securely enclosing the circuit board 16. The method prevents portions of the circuitry on the circuit board 16 from operating when removed from the housing 12 or if the housing 12 has been compromised.

FIG. 2 shows a block diagram of the components used to implement the tamper detection system in the controller 10.

The operating voltage is first received through the input supply 20 via the connector portion 14. The operating voltage at this stage is typically the vehicle system voltage received when the ignition of the vehicle is activated. The ignition voltage level for a heavy vehicle can range from +12V to +24V. The operating voltage passes through a resistor array 22. The resistor array 22 reduces the operating voltage level.

The operating voltage passes through an input filter 24. The input filter 24 reduces the noise on the operating voltage. The operating voltage is subject to electrical noise from surrounding wires, electromagnetic interference, and other sources. The input filter 24 removes or reduces the noise levels on the operating voltage.

The operating voltage passes through a regulator circuit 26. The regulator circuit 26 reduces the operating voltage further to a voltage usable by the sensitive equipment on the circuit board 16, such as +5V. The regulator circuit 26 may be a linear regulator, a switching regulator, or a low drop out regulator. In a circuit that would use a switching regulator, resistor array 22 and signal conditioning circuit 28 would not be necessary.

The operating voltage also connects to a signal conditioning circuit 28 from the input supply 20. The signal conditioning circuit 28 reduces the input voltage to the regulator circuit 26.

In one example, the signal conditioning circuit 28 and regulator circuit 26 may be combined in one signal conditioning device.

The operating voltage as it leaves the regulator circuit 26 enters an output filter 38. The output filter 38 provides the operating voltage required by the rest of the circuitry on the circuit board 16 at the output supply 40. The output supply voltage is determined by the configuration of the regulator circuit 26. In one example, the output supply voltage is the nominal voltage (e.g., +5V) needed for the microcontroller(s) on the circuit board 16 to operate.

The light based circuitry 30 includes a logic circuit 32, an amplifier or switch 34 and a light sensor 36. The light based circuitry 30 will activate the regulator circuit 26 and the signal conditioning circuit 28. The light based circuitry 30 is powered directly from the input supply 20.

The light based circuitry 30 controls the operation of the regulator circuit 26 and the signal conditioning circuit 28, or of the combined single signal conditioning device.

The light sensor 36 may be any type of sensor or switch that detects light, such as resistive device or an active device like a photodiode or phototransistor. A resistive device offers lower sensitivity compared to an active device and is typically on whenever any level of light is detected. In an example when the light sensor 36 is a switch, as long as the light sensor 36 is "closed", the regulator circuit 26 and signal conditioning circuit 28 are operating. Based on the response timing of the light based circuitry 30 and the material of housing 12, the appropriate light sensor can be selected. The light sensor 36 will be detecting ambient light and not light from a specific external source or a powered light source on the circuit board 16 itself.

The light based circuitry 30 operates independently of any control or input from a microcontroller or other circuitry on the circuit board in order to provide the tamper detection feature.

Figure 3:
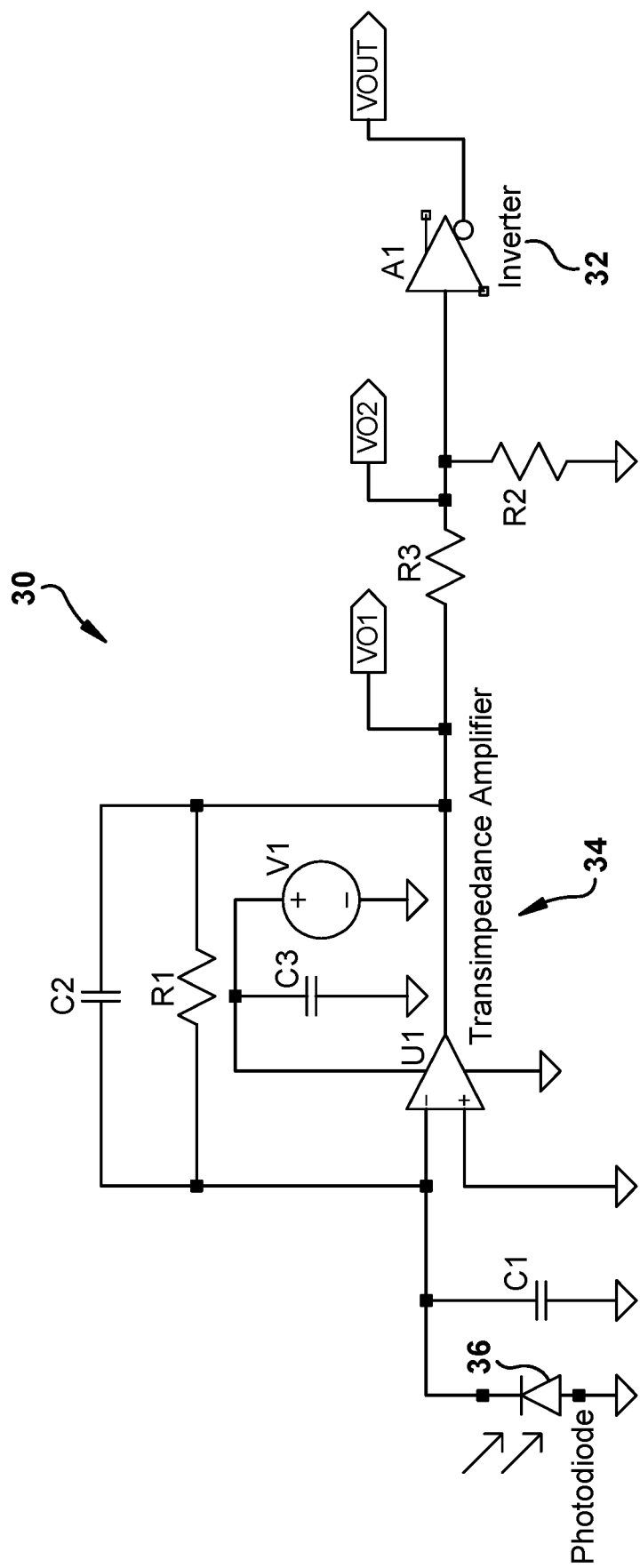
FIG. 3 is a representative circuit that may used in the tamper detection system.

FIG. 3 shows an example implementation of the light based circuitry 30. The light sensor 36 is shown as a photodiode in this example. The photodiode is normally a low signal when no light is received (or "closed"). When light is received by the photodiode, the amplifier 34 receives a high signal. This high signal is amplified and sent to the logic circuit 32, which in this example is an inverter. The invertor will change the high signal to a low signal at Vout. Vout is received by the regulator circuit 26. When Vout is low, the regulator circuit 26 does not regulate the voltage and no voltage is transmitted to the output filter 38. Vout is also received by the signal conditioning circuit 28.

The light based circuitry 30 can be in the form of an integrated circuit chip and indistinguishable from dozens of other integrated circuits on the circuit board 16. Only a party authorized to review or troubleshoot the board will know which circuit chip or individual light sensor 36 has to be "covered" or "jumped" before legitimate troubleshooting can begin. The circuit or sensor must remain in the low or "closed" state in order to allow the regulator circuit 26 and signal conditioning circuit 28 to operate. When the circuit board 16 is powered but the housing 12 is removed, the circuit or sensor must not be exposed to any source of light in order for the controller 10 to operate. The light based circuitry 30 may also include internal traces on the circuit board 16 to make it more difficult for any unauthorized user to bypass the light based circuitry 30.

Therefore, a tamper detection system for a controller includes a housing, a circuit board mounted in the housing, a voltage input line on the circuit board receiving an operating voltage, a light detection circuit mounted on the circuit board receiving the operating voltage from the voltage input line and a signal conditioning device conditioning the operating voltage and connected to the light detection circuit. The light detection circuit interrupts the operating voltage at the signal conditioning device in response to detecting a source of light having a light value greater than a threshold.

Figure 4:
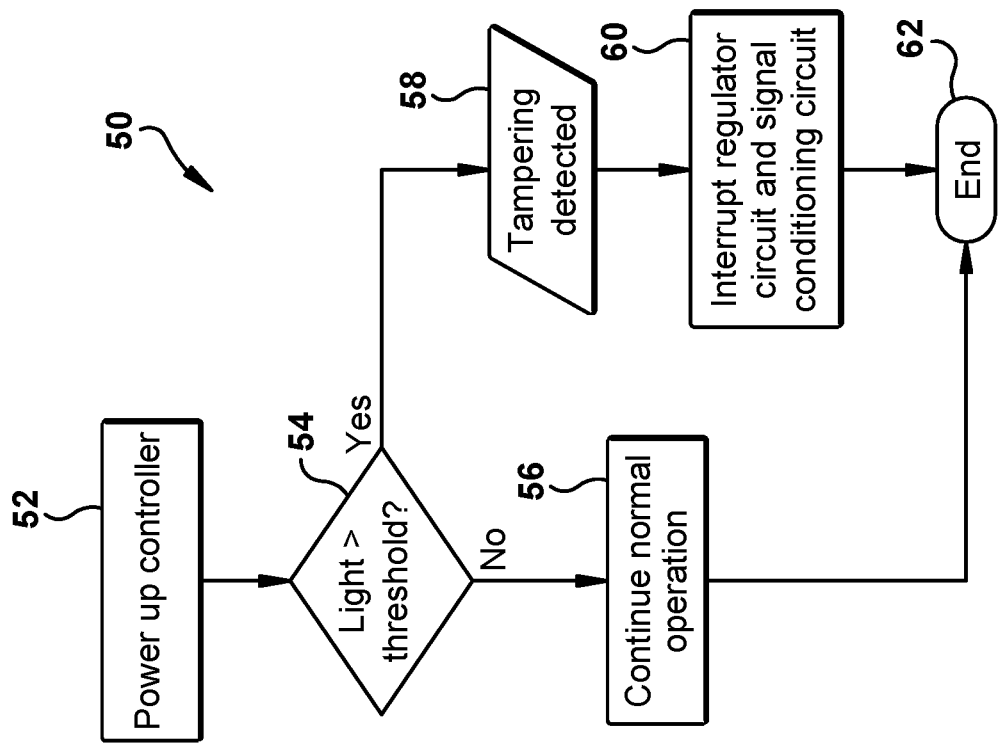
FIG. 4 is a flow chart of the tamper detection method implemented in the controller.

FIG. 4 displays a method 50 of detecting tampering of the controller housing 12 when the circuit board 16 includes a system as in FIG. 2. In step 52, the controller 10 is powered up by receiving an operating voltage at the input supply 20. In step 54, the light based circuit 30 determines if the detected light is greater than a threshold. If the luminosity level is less than or equal to the threshold, the method proceeds to step 56 where normal operation of the controller 10 continues. The method 50 ends at step 62.

If the luminosity is greater than the threshold, tampering is detected as in step 58. The threshold may be set at zero, for example. However, the threshold may be pre-set by the manufacturer at a different level, such as when a sensor is used rather than a switch. The threshold can be adjustable by the modifying the light based circuitry 30. In another example, the threshold can be defined to be greater than the amount of ambient lightning expected inside the enclosure in a normal operating condition. Some enclosures are not sealed perfectly against the possible penetration of light, but still provide adequate sealing against environmental factors. Based on the types of enclosure and the users' needs, the threshold can be defined by the type of sensor selected and by changing the gain of the amplifier so that there is not an interruption of the power circuit under normal operating conditions.

In step 60, the light based circuitry 30 interrupts the normal operation of the regulator circuit 26 and the signal conditioning circuit 28 by interrupting the power supplied to the regulator circuit 26 and signal conditioning circuit 28 as described in FIG. 2. In this manner, an unauthorized person cannot open the housing 12 and try to troubleshoot the circuit or hack into the software by directly connecting to the microcontroller(s) on the circuit board 16. The power to any component downstream of the regulator circuit 26 and signal conditioning circuit 28 will not be provided as long as the tamper detection circuitry 30 is detecting luminosity above the threshold.

In another example, a plurality of light sensors 36 may be used in different locations on the circuit board 16 in order to better sense the change in light. The position of the light sensor(s) 36 on the circuit board 16 is important so that ambient light can be detected quickly after the housing 12 is removed from the circuit board 16.

If the input supply 20 is not available when the housing 12 is removed from the circuit board 16, the light sensor 36 will not work. However, if the circuit board 16 is powered up in the open housing state, then the light sensor 36 will prevent the regulator circuit 26 and signal conditioning circuit 28 from providing the operating voltage downstream.

This design may also detect when the housing 12 is damaged and allowing ambient light to enter the circuit board space but may not be damaged in a manner visible to the naked eye. Even small breaches in the housing 12 may allow water or contaminants to enter the circuit board space and damage the sensitive components. In this instance, the light based circuit 30 would prevent the operating voltage from being received by downstream circuits and the controller 10 would not be operational. When a light sensor 36 that is capable of measuring differing levels of light is used, then a determination can be made whether the entire housing 12 has been removed or whether there is a small breach in the housing 12.

The light based circuit 30 will continue to operate even after the initial power up cycle of the controller 10. The controller 10 is capable of tracking the interruption of the power such that the memory contents can be saved. In another example, the time at which the luminosity is greater than the threshold may be stored in a memory location by the light based circuitry 30. The time can be used to determine a failure of the housing 12 itself or to document the unauthorized access attempt.

Therefore, a method for disabling a controller in response to unauthorized access includes receiving an operating voltage and powering a light detection circuit and a signal conditioning device of the controller with the operating voltage. The method further includes comparing a light value to a threshold in the light detection circuit, wherein the light detection circuit inhibits the operating voltage from reaching the signal conditioning device in response to the light value being greater than the threshold. The controller is thereby disabled.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A tamper detection system for a controller comprising:
a housing;
a circuit board installed in the housing;
a voltage input line on the circuit board receiving an operating voltage;
a light detection circuit provided on the circuit board receiving the operating voltage from the voltage input line;
a signal conditioning device conditioning the operating voltage and connected to the light detection circuit,
wherein the light detection circuit interrupts the operating voltage at the signal conditioning device in response to detecting a source of light having a light value greater than a threshold.

2. The tamper detection system as in claim 1, wherein the light detection circuit contains a plurality of light sensors.

3. The tamper detection system as in claim 1, wherein the signal conditioning device includes a signal conditioning circuit and a regulator circuit separately connected to the light detection circuit.

4. The tamper detection system as in claim 3, wherein the regulator circuit is one of a switching regulator, a linear regulator, and a low drop out regulator.

5. The tamper detection system as in claim 1, wherein the light detection circuit includes a light switch.

6. The tamper detection system as in claim 1, wherein the light detection circuit includes a light sensor.

7. The tamper detection system as in claim 1, wherein the light detection circuit is adapted to detect ambient light.

8. The tamper detection system as in claim 1, wherein the threshold is defined to be greater than the ambient lighting inside the enclosure in a normal operating condition.

9. The tamper detection system as in claim 1 wherein the light detection circuit operates independently from a microcontroller on the circuit board.

10. A method for disabling a controller in response to unauthorized access comprising:
receiving an operating voltage;
powering a light detection circuit and a signal conditioning device of the controller with the operating voltage; and
comparing a light value to a threshold in the light detection circuit, wherein the light detection circuit inhibits the operating voltage from reaching the signal conditioning device in response to the light value being greater than the threshold, thereby disabling the controller.

11. The method as in claim 10, further comprising adjusting the threshold based on the type of sensor being used and the gain of the amplifier.

12. The method as in claim 10, further comprising adjusting the threshold to be greater than the ambient lighting inside the enclosure under normal operating conditions.

* * * * *